United States Patent
Lammens et al.

(10) Patent No.: US 7,382,490 B2
(45) Date of Patent: Jun. 3, 2008

(54) 4-DIMENSIONAL GRAY NEUTRALITY CALIBRATION

(75) Inventors: Johan Lammens, Barcelona (ES); Michel Encrenaz, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 1003 days.

(21) Appl. No.: 10/664,805

(22) Filed: Sep. 19, 2003

(65) Prior Publication Data

US 2005/0062985 A1   Mar. 24, 2005

(51) Int. Cl.
*G06F 15/00* (2006.01)

(52) U.S. Cl. .............. 358/1.9; 358/518; 358/520; 382/162; 382/167

(58) Field of Classification Search ............. 358/1.9, 358/518, 520; 382/162, 167
See application file for complete search history.

(56) References Cited

U.S. PATENT DOCUMENTS

| | | | |
|---|---|---|---|
| 3,893,166 A | 7/1975 | Pugsley | |
| 4,346,402 A | 8/1982 | Pugsley | |
| 4,482,917 A | 11/1984 | Gaulke et al. | |
| 6,008,907 A * | 12/1999 | Vigneau et al. | 358/1.9 |
| 6,178,008 B1 * | 1/2001 | Bockman et al. | 358/1.9 |
| 6,266,165 B1 * | 7/2001 | Huang et al. | 358/520 |
| 6,665,434 B1 * | 12/2003 | Yamaguchi | 382/162 |
| 6,804,027 B2 * | 10/2004 | Lee et al. | 358/1.9 |
| 7,027,182 B1 * | 4/2006 | Soler | 358/1.9 |
| 7,251,058 B2 * | 7/2007 | Pop | 358/1.9 |
| 2004/0057060 A1 * | 3/2004 | Johannesson et al. | 358/1.9 |

FOREIGN PATENT DOCUMENTS

| | | |
|---|---|---|
| EP | 0562971 | 3/1993 |
| EP | 1128255 | 12/2000 |

* cited by examiner

*Primary Examiner*—Kimberly Williams
*Assistant Examiner*—Michael Burleson

(57) ABSTRACT

A method of applying a gray neutrality calibration to a color signal, said method comprising: representing said color signal as a position in a multi dimensional color space, in which each said dimension of said color space represents a respective primary color; defining a gray axis in said multi dimensional color space as a set of coordinates for which a plurality of said primary colors each have a same value as each other; determining a distance between said position representing said color signal and said gray axis; and using said determined distance between said color signal position and said gray axis to apply a gray neutrality correction to said input color signal.

18 Claims, 9 Drawing Sheets

4-DIMENSIONAL GRAY NEUTRALITY CALIBRATION

FIELD OF THE INVENTION

The present invention relates to the field of printers.

BACKGROUND TO THE INVENTION

A printed grayscale extends at one end from no ink (which shows as white on a white print media) through various shades of gray to full black at the other end of the grayscale.

It is often desirable or necessary to apply a "gray neutrality calibration" correction to a printer device's color space in order to have the printer produce visually neutral grays with some well defined digital inputs, for example equal values of cyan, magenta, and yellow. That is, the values C=M=Y. A common way to achieve this is to apply a 1-dimensional "transfer function" to each of the cyan, magenta and yellow colorants separately. Such transfer functions can be calculated based on the colorimetric or densitometric measurements of a printer's "raw" behavior.

However, an undesirable side effect of using 1-dimensional transfer functions is that they not only affect the gray axis (C=M=Y) but also, the rest of the printer's gamut, i.e. the range of colors, that can be obtained by mixing three or more inks. This can lead to non-linearities, contouring, difficulties in creating color maps, gamut reductions, and other artifacts.

There is a problem in printing grayscale images on an inkjet printer device, using the conventional gray neutrality calibration, that the images do not appear to be gray to the naked eye, and are tinted with a non neutral color, that is the gray looks reddish, brownish, yellowish or greenish. In practice, ensuring a neutral gray color is printed is a non trivial problem, especially when working with a 4 color printer, or a 6 color printer, such as the Hewlett Packard DesignJet 5000 type printer.

Ideally, the gray neutrality calibration should be applied only to the gray axis, but without creating discontinuities elsewhere.

SUMMARY OF THE INVENTION

According to a first aspect of the present invention there is provided a method of applying a gray neutrality calibration to a color signal, said method comprising:

representing said color signal as a position in a multi dimensional color space, in which each said dimension of said color space represents a respective primary color;

defining a gray axis in said multi dimensional color space as a set of coordinates for which a plurality of said primary colors each have a same value as each other;

determining a distance between said position representing said color signal and said gray axis; and using said determined distance between said color signal position and said gray axis to applying a gray neutrality correction for correcting an input color signal.

According to a second aspect of the present invention, there is provided a method for applying a first set of gray balancing color corrections to a printer's gray axis, a second set of different color corrections to a printer's gamut surface, and continuously varying intermediate color corrections everywhere else in the gamut, the method comprising:

calculating a grayness function which evaluates the distance to the gray axis for a plurality of color signals each carrying a single color data of a multi-dimensional image data; and using the value of said grayness function and its complement as weights for a linear combination of two sets of color corrections applied to a said plurality of color signals; and generating an output of said linear combination of color corrections, such that an input into a said color signal channel for a color combination which lies upon the printer's gray axis is affected only by said first set of color corrections, an input into a said color signal channel for a color combination which lies upon the gamut surface is affected only by said second set of color corrections, and an input into a said color signal channel for a color combination which lies in between the gray axis and the gamut surface is affected by both said sets of color corrections, in function of the distance to the gray axis and gamut surface, respectively.

Using the grayness function avoids the problem of loss of gamut by ensuring that the color corrections are applied only when grays are being printed, and not for non gray colors.

Other aspects are as recited in the claims herein, and the scope of the invention is limited only by the claimed features.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

Figure 1:
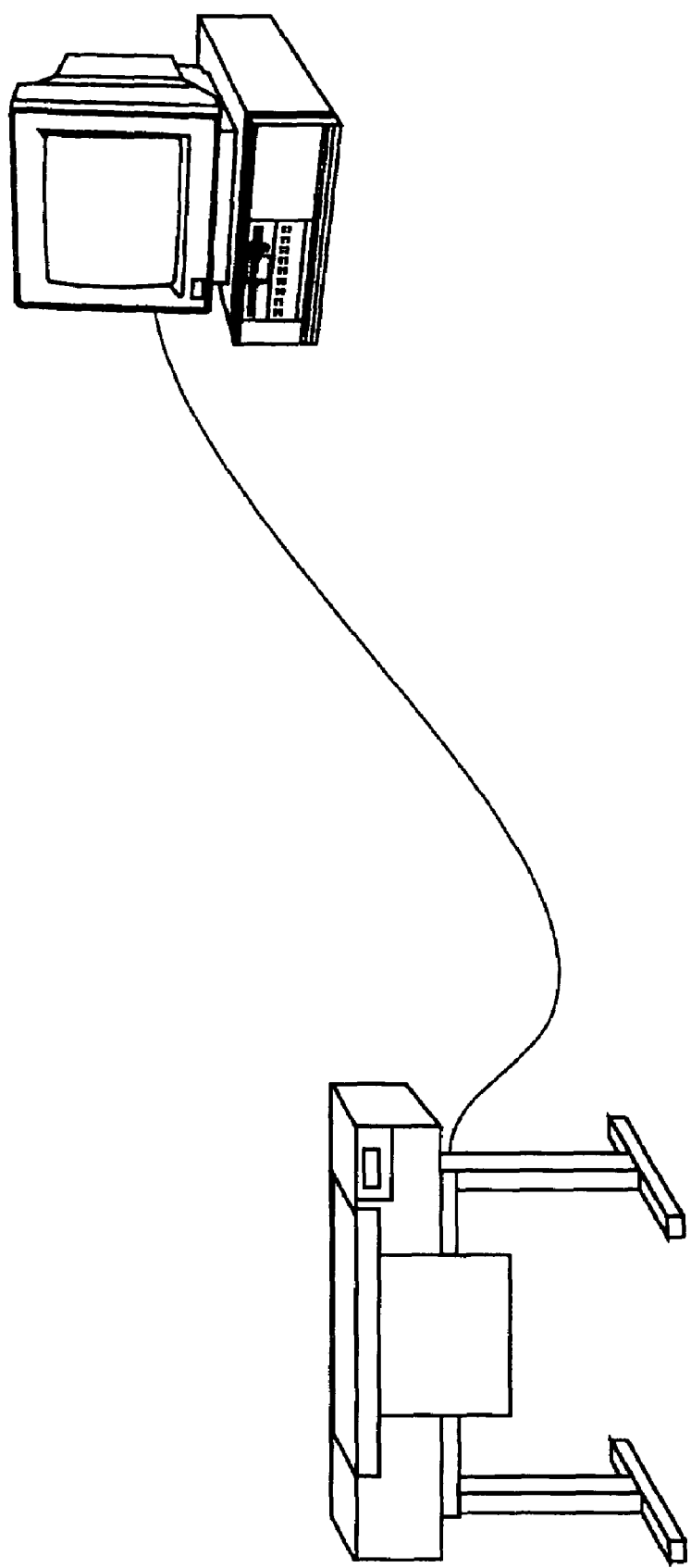
FIG. 1 illustrates schematically a large format inkjet printer device for printing large format posters, and which receives an image data from an image source, such as a computer having an image generating application.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

One object of specific implementations according to the present invention is to ensure that when grayscales are printing on a printer device, they appear to an observer to look gray, rather than a shade of green, brown, red, yellow, or tinted by some other non neutral color.

Specific methods according to the present invention implement generation of 4-dimensional look up tables starting from a first set of transfer functions to be applied to the gray axis (C=M=Y) and a second set of transfer functions to be applied to the gamut surface, with continuously varying behavior in-between.

Such 4-dimensional look up tables can then be for example, included in a "device link" type ICC profile, and applied with any ICC compatible color management module which can handle this type of profile.

In a best mode implementation, the core of the method is a "grayness function" defined as:

$$g(c,m,y)=\min(c,m,y)/\max(c,m,y) \text{ for } \max(c,m,y)>0$$

$$g(c,m,y)=1 \text{ for } \max(c,m,y)=0 \qquad \text{Equations 1:}$$

The g function returns a value of 1 for every point on the gray axis (C=M=Y), and a value of 0 for every point on the gamut surface with exception of (0,0,0) and (1,1,1), which are considered part of the gray axis.

A 4-dimensional look up table is then defined with an arbitrary number of control points (nodes) in each dimension, where the output values at each node are given by the following equations:

$$c'=g(c,m,y)*GNCc(c)+(1-g(c,m,y))*ID(c)$$

$$m'=g(c,m,y)*GNCm(m)+(1-g(c,m,y))*ID(m)$$

$$y'=g(c,m,y)*GNCy(y)+(1-g(c,m,y))*ID(y)$$

$$k'=ID(k) \qquad \text{Equations 2:}$$

where:
g is the grayness function;
GNCc is the gray neutrality transfer function for the color cyan, and similarly GNCm and GNCy are gray neutrality transfer functions for magenta and yellow respectively;
ID is an identity function.

The output values c', m', y' respectively for each color are obtained as a linear combination of the gray neutrality transfer functions GNC, and the identity transfer functions ID, weighted by the grayness function g and its complement respectively.

The output values corresponding to inputs that are not represented exactly by the nodes (control points) of the lookup table are obtained by standard multi dimensional interpolation techniques, such as multi-linear or tetrahedral interpolation.

Alternatively, the use of lookup tables can be avoided altogether by applying equations 1 and 2 directly to any combinations of c, m, y and k input values, generating the output values c', m', y' and k'. Such algorithmic application may benefit from hardware assistance in order to obtain the necessary throughput.

This method can be applied to any two sets of transfer functions that have to be applied differentially to the gray axis versus the gamut surface. The method can be applied equally to three color CMY device spaces as to four color CMYK device spaces. Other extensions may include further modifications of the grayness function to incorporate quadratic or other non linear behavior, and non identity transfer functions applied to K. If the black ink K needs to be corrected together with C, M and Y for gray balancing, then the last clause of equations 2 would be written as $$k'=g(c,m,y)*GNCk(k)+(1-g(c,m,y))*ID(k) \qquad \text{Equation 3:}$$

Although the examples shown so far involve two sets of one-dimensional transfer function, other types of corrections are possible. In its more general form we can rewrite equations 2 as $$(c',m',y',k')=g(c,m,y)*f1(c,m,y,k)+(1-g(c,m,y))*f2(c,m,y,k)$$

where g is the grayness function as defined in equations 1, f1 is a first multi-dimensional color correction function to be applied to the gray axis, and f2 is a second multi-dimensional color correction function to be applied to the gamut surface.

Due to the differential application of corrections to the gray axis versus the gamut surface and in-between, the side effects of using global transfer functions can be mitigated or avoided altogether. Likewise, since the gray neutrality transfer functions are applied only (or mainly) to the gray axis, they can be designed without constraining them unnecessarily to for example reach 100% output at 100% input in order to prevent gamut reductions. This means greater design freedom for gray neutrality transfer functions and hence better gray balancing.

There will now be described a specific implementation of the printer device which applies a gray neutrality calibration within a color signal processing channel, according to the specific embodiment of the present invention.

Referring to FIG. 1 herein, there is illustrated schematically a print system comprising a 6 color printer, for example a Hewlett Packard Design Jet 5000 series Inkjet printer device, and a computer providing image data to the printer device. The printer device comprises a free standing chassis unit containing a printer mechanism comprising a media transport mechanism for carriage and movement of a sheet or roll of print media, and a print head, carrying a plurality of inkjet nozzles, one group of nozzles for each color; a user interface for interfacing with an external computer device 101; and a controller firm ware.

Figure 2:
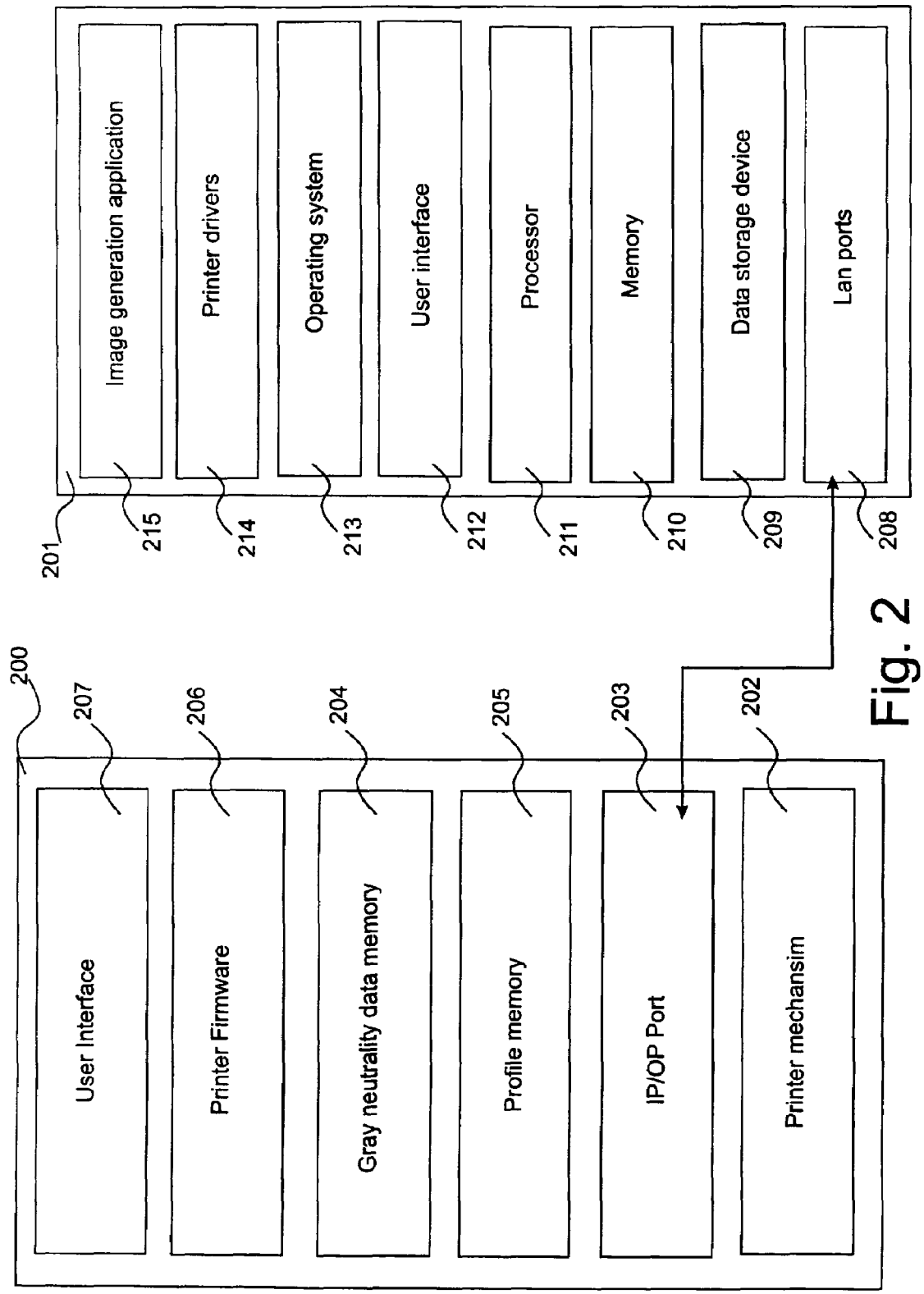
FIG. 2 illustrates schematically components of the printer device and image generating computer of FIG. 1 for driving a multi color ink print head across a print media for producing printed images.

Referring to FIG. 2 herein, there is illustrated schematically in further detail components of the printing system of FIG. 1 comprising printer device 200 and computer 201. The printer device comprises a print mechanism 202 consisting of a media transport mechanism for carrying a sheet or roll of print media, and a print head which traverses across the print media for printing onto the print media; an input/output port 203 for communicating with the computer; a gray neutrality data memory 204, for storing a plurality of multi-dimensional look up tables for applying gray neutrality corrections to color data signals, each corresponding to different combinations of ink, media and printmode (number of print passes, carriage speed, etc.); comprising a profile memory 205 for storing a plurality of print profiles, each print profile suitable for printing a different combination of print media and ink; print firmware 206, the print firmware controlling the printer device; and a user interface 207, for example a small liquid crystal display or similar, or a web interface.

Computer 201 comprises one of more input/output ports 208; a data storage device 209, for a example a hard disk drive unit; at least one memory device 210; a data processor device 211; a user interface 212, including a keyboard, pointing device, and visual display unit; an operating system 213, for example the known Unix®, Linux®, or Microsoft Windows® operating system; one or more print drivers 214 for driving the printer; and an image generating application 215 for generating RGB, CIELAB, or CMYK image data for printing by the printer device.

Figure 3:
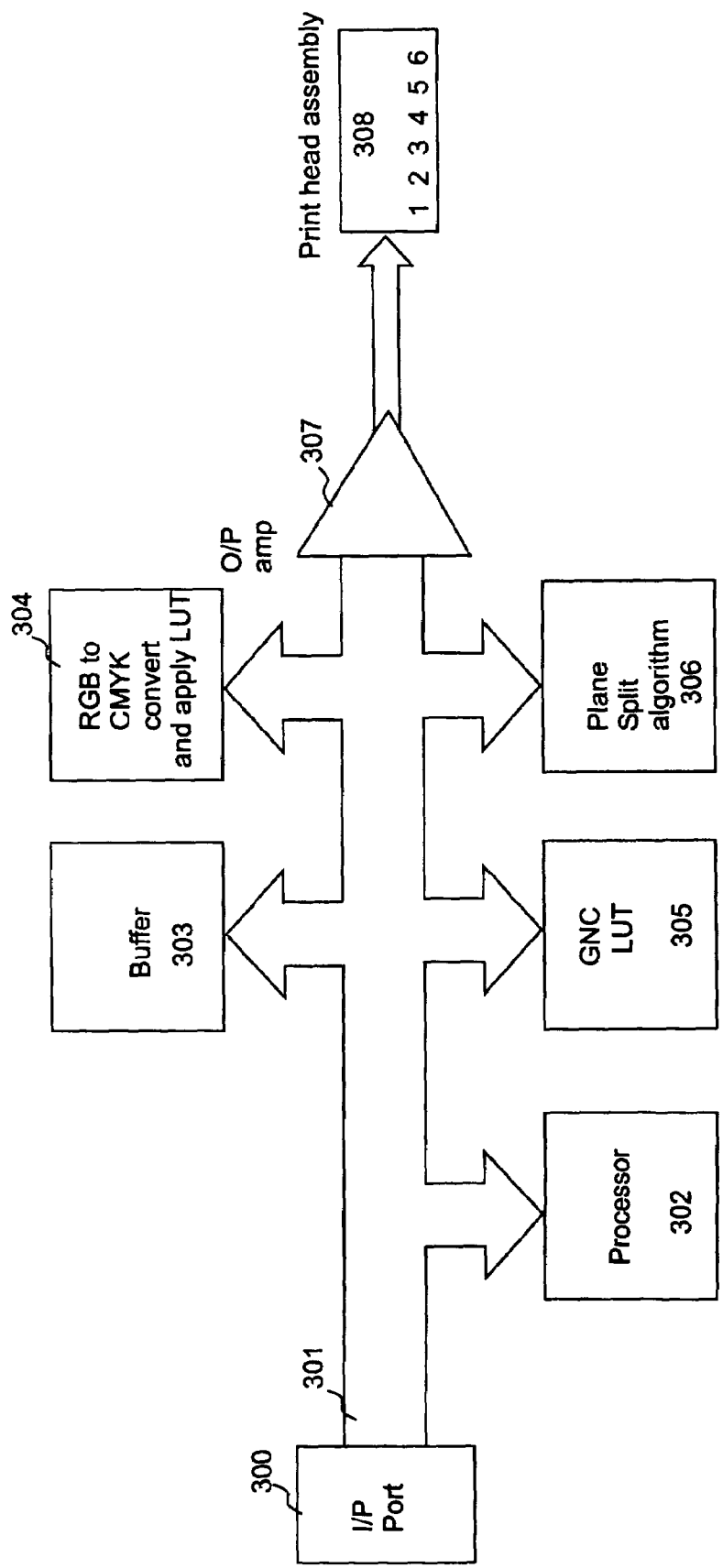
FIG. 3 illustrates schematically components of a print channel within the printer device, for receiving an image data, and driving a print head for printing an image according to the input image data.

Referring to FIG. 3 herein, there is illustrated schematically components of a print channel of the printer device. The print channel comprises the input/output port 300; for inputting RGB, CIELAB, or CMYK image data; a data bus 301; a processor device 302; a color map profile 303; a buffer device 304 for inputting and temporarily storing RGB image data, whilst data processes are carried out on the RGB image data to convert it into CMYK image data according to the color profile; an RGB to CMYK conversion algorithm 305 for applying RGB to CMYK color space conversion to the image data and for applying a look up table to the CMYK image data; a set of 4-dimensional look up tables for applying gray neutrality calibration to CMYK image data; a plane splitter algorithm 307 for applying plane splitting to individual colors of the CMYK image data; an output amplifier 308 having 6 signals outputs, each for driving a corresponding respective inkjet head within print head assembly 309.

Within the print channel, each Red Green Blue (RGB) or L*a*b* (CIELAB) color has its own separate processing channel. After RGB or CIELAB to CMYK conversion, each CMYK color has its own color signal channel giving 4 channels. The printer can also accept CMYK image data directly. The 4 channels are gray balanced using the Gray Neutrality Calibration lookup table 306 as described below. Next, the 4 channels are fed into the plane splitter, which takes 2 of the color channels, cyan and magenta, and splits each of those channels into two channels, resulting in a total of 6 channels fed into the output amplifier 307, which outputs 6 amplified color signal channels to the print head assembly, one for each print head.

By 6 color, it is meant here a combination of the known cyan, magenta, yellow and black inks (C M Y K), plus light cyan and light magenta. The light cyan and light magenta inks use the same colorants as the cyan and magenta inks, but in a lighter dilution. Light inks are used for printing very pale colors in highlights of images. When very pale colors are being printed, the light inks are used instead of their full density counterparts, because the lights inks reduce dot visibility, and result in a visually smoother image.

There are basically two ways of achieving printing of a grayscale image in a 4 color or 6 color printer device.

Firstly, the grayscale image can be printed using a black ink only, and this gives a grayscale image by definition. However, typically this is not done because dots of black ink are very visible so this results in a grainy appearance on the image. Also, there are other known image quality problems which arise using black ink only, therefore typically this solution is not preferred.

Secondly, grayscale images can be produced using all the inks. In a 6 color system this includes the light cyan and light magenta, dark cyan, dark magenta, yellow and black. These inks can be mixed in such a way that the overall appearance is gray. Since this process involves using a set of color inks, and not just black or gray ink, mixing of the inks to achieve a neutral gray appearance requires some calibration of the amounts of ink relative to each other in the printer device.

The calibration of mixing of 4 color inks or 6 color inks is relatively difficult to control. If there is a slight imbalance between for instance the cyan and the magenta inks, or between any of the other colors, in any of their density variance, off gray hues will be obtained, giving for example greenish, brownish, reddish or yellowish looking grays.

The issue of gray neutrality (otherwise known as gray balancing) is not only relevant for printing pure grayscale images, but also affects the printing of color images, so that in 4 color printing gray may be regarded as the most important color to control, and the same applies to 6 color printing.

In practice, balancing 4 different colors to obtain a neutral gray is difficult, and balancing 6 colors to produce a neutral gray is even more difficult. With 6 color inks, the problem is compounded because the light inks are used a lot in highlights, and since they are so light there needs to be used a greater amount of a light ink to get the same visual density as would need to be used for the equivalent dark ink. For example to recreate the appearance of a 25% magenta area fill with a full density ink, then using a light magenta ink a 50% area fill would need to be used to obtain the same effect. This means that even very slight adjustments in calibration in each of the 4 color channels before plane split results in a relatively large adjustment in the amount of light inks which reaches the print media, after plane split. Therefore, the whole gray calibration process is sensitive to small imbalances between the color channels.

Figure 4:
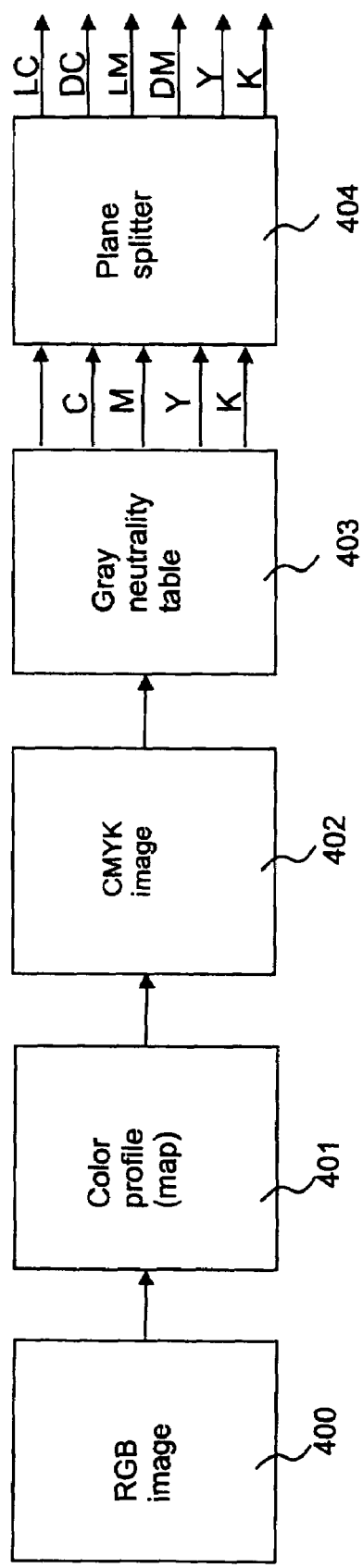
FIG. 4 illustrates schematically a work flow process for converting an RGB image data into a multi color image data for driving a print head within the printer device of FIGS. 1, 2, and 3.

Referring to FIG. 4 herein, there is illustrated schematically digital signal processing stages implemented in a signal processing channel of the printer device of FIGS. 1 to 3 herein, for converting a red, green blue (RGB) digital image data into a 6 color digital image data. RGB image 400 can either be a color RGB image, or a grayscale which is coded as RGB. This is input into a color profile 401, otherwise known as a color map, which converts the RGB image into a cyan, magenta, yellow, black (CMYK) image 402. The color profile 401 is dependant upon various parameters including the ink type, the media type, the print mode of the printer, and various other parameters. The color profile obtains a 4 color separation of the original RGB image. The 4 colors are output as 4 color data channels CMYK, where the data represents various amounts of the 4 inks at spatial locations across a 2 dimensional image. The 4 color CMYK image data is input into a gray neutrality table 403, which applies gray neutrality calibration to the CMYK data. To obtain a 6 color image data, the 4 color image data is input into a plane splitting process 404 which takes individual color data channels, for example cyan and magenta, and separates each of those channels into 2 channels. For example the cyan data channel is split in to a light cyan data channel and a dark cyan data channel and the magenta data channel is separated into a light magenta channel and a dark magenta channel.

Figure 5:
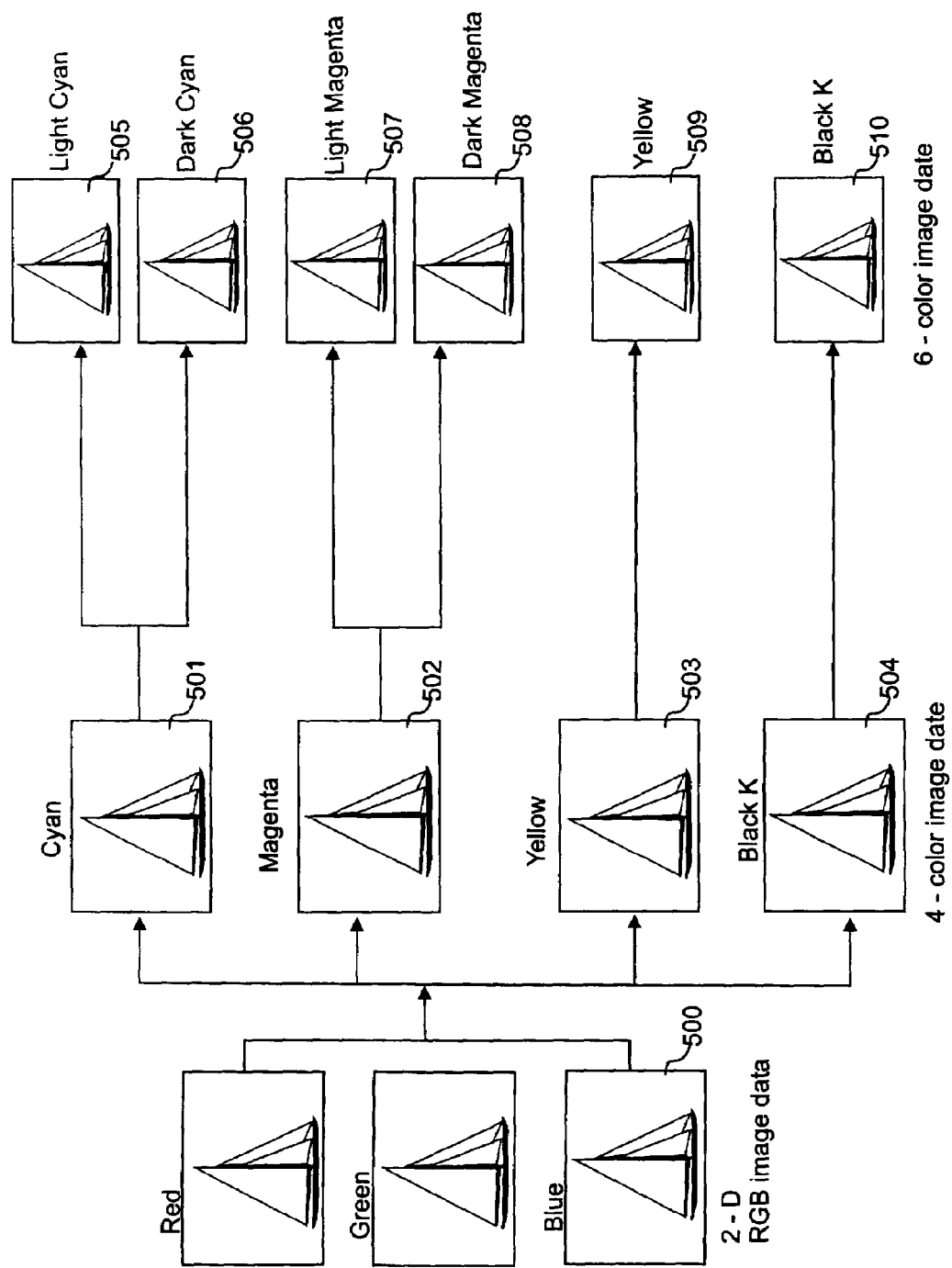
FIG. 5 illustrates schematically image data processing of an RGB image data and conversion into a 6 color channel image data by the printer device of FIGS. 1, 2 and 3.

Referring to FIG. 5 herein, there is shown schematically how data in each of the color channels can be represented as image planes. For example a 2 dimensional RGB image 500 after passing through the color profiler results in 4 planes of color data CMYK, 501-504 respectively. Two of the channels, in this example cyan and magenta are input into the plane splitter 503, resulting in a light cyan plane 505, a dark cyan plane 506, a light magenta plane 507 and a dark magenta plane 508. The result is 6 color planes 505-510 for light cyan, dark cyan, light magenta, dark magenta, yellow and black respectively. Each of the color planes has two spatial dimensions, X, Y and is carried on a separate data channel within the printer device.

In order to obtain the final printed image, the 6 color planes must be matched to each other and calibrated, such that neutral grays can be obtained by combining the 6 color planes. This is equivalent to calibrating 6 channels of color data, so that when ink is produced by 6 separate inkjet heads (otherwise known as ink pens), each controlled according to a corresponding respective color signal channel, the resultant image is capable of achieving neutral grays.

The color profile actually separates the CMYK color signal from a CIELAB, image data. In this specification, where the term RGB (red, green, blue) is used, to describe an image data, it will be understood by the person skilled in the art that a CIELAB image data plane may be substituted, and performance of the specific embodiments and methods according to the invention are equivalent, after taking into account the distinctions between RGB and CIELAB formats which will be understood by those skilled in the art.

The color profile may be generated with embedded gray calibration, with respect to a particular illuminant. A further complicating factor for obtaining visually neutral grays by balancing a plurality of color inks, is that gray neutrality can only be achieved with respect to a particular illuminant, media and ink combination and print resolution. An illuminant is a standardized light source. For example daylight may differ depending upon weather conditions, and geographical location. Further physical light sources such as incandescent bulbs, and fluorescent lamps may also vary in the light spectra which they emit. The international light commission (CIE) publishes standards for different types of light source into a set of theoretical light sources each of which is described by its own spectral power distribution. Typically, the specific illuminant D50 is widely used in graphical arts for the purposes of profiling and calibration of colors, which represents daylight with a color temperature of 5000 Kelvin.

A different color profile is generated for each combination of print media type, ink type, and print quality (print mode), so at manufacture of a printer device, a set of pre-determined color profiles are loaded into the printer device in a profile library, so that for each combination of print media, ink type and print mode, a corresponding respective profile is selected in the image data processing channel in order to generate the final printed image by emitting jets of ink onto the print media.

Similarly, a different multi-dimensional Gray Neutrality Calibration look up table is generated for each combination of print media type, ink type and print quality, and at manufacture of the printer device, a set of look up tables are loaded into the printer device, in a look up table library, so that for each combination of print media, ink type and print mode, a corresponding respective look up table is selected in the image data processing channel in order to generate a gray neutrality correction to the multi-channel image data, so that the ink emitted by the ink jets onto the print media produce visually neutral grays which are optimized for that particular combination of ink type, media type, illuminant, and print resolution.

Figure 6:
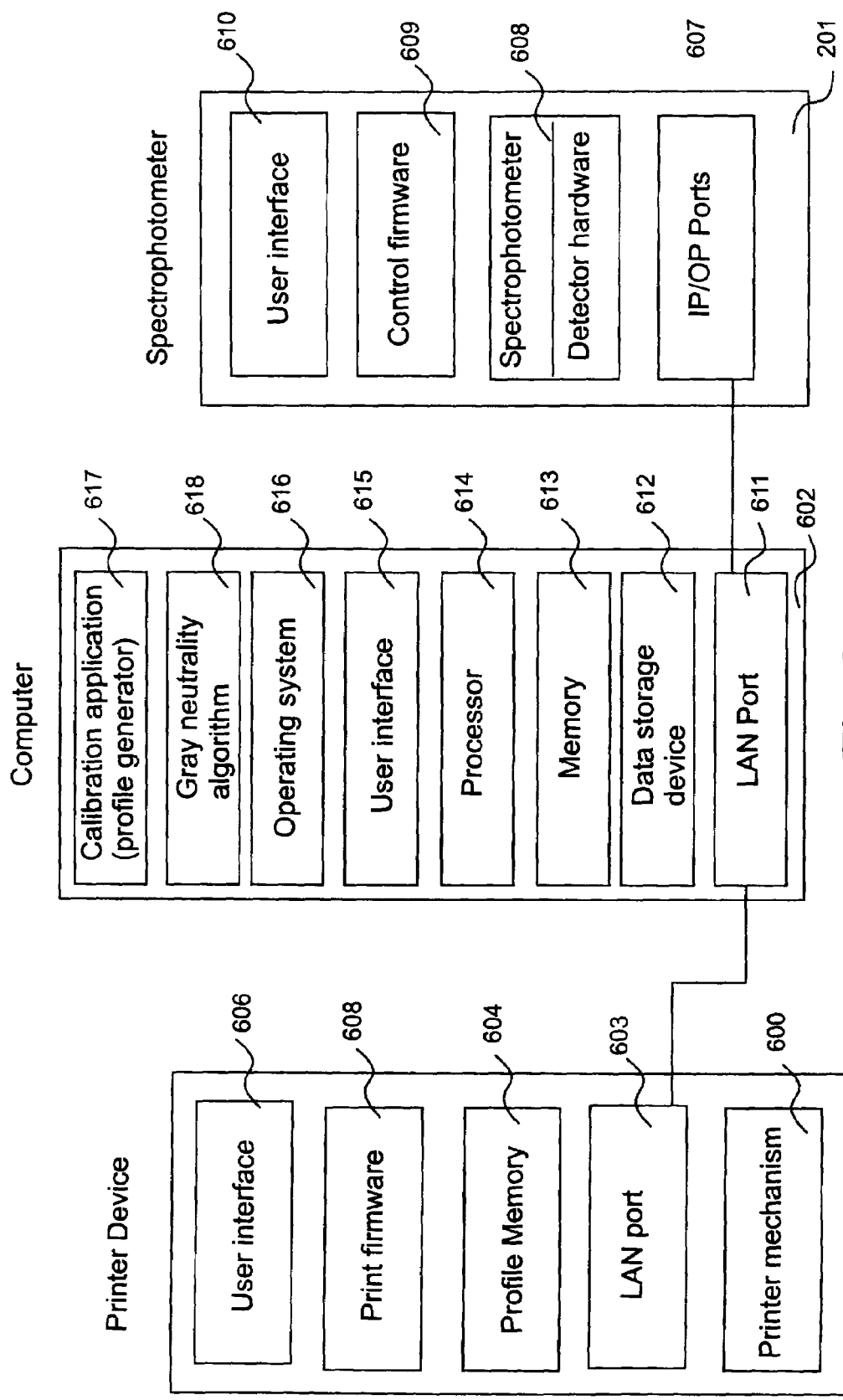
FIG. 6 illustrates schematically a calibration arrangement for performing a calibration process on the print channel of a printer device.

Referring to FIG. 6 herein, there is illustrated schematically components in a printer calibration system comprising a printer device 600, a spectrophotometer 601, and a computer device 602.

The (un-calibrated) printer device is used to print an array of gray shades, which are then read and analyzed by the spectrophotometer. The spectrophotometer outputs spectral data for each of the grays, which is fed into the computer device. The computer device applies an algorithm which calculates a set of transfer functions for correcting the signals in each individual color CMYK channel, so that when that signal data is fed back into the printer device and re-printed a second array of grayscale color patches results. The second set of grayscale color patches may be visually and/or instrumentally inspected to check that they are true grays, without any color cast.

The printer device, as described before comprises a printer mechanism 603, one or more input/output ports 604; a profile memory 605; printer firmware 606 and a user interface 607.

Spectrophotometer 601 comprises one or more input/output ports 607; a spectrophotometer detector hardware comprising a series of detectors for detecting light reflected from a set of inks under an illuminant, and generating a spectral power density curve from the received illumination; a control firmware component 609 for controlling the spectrophotometer detector hardware; and a user interface 610.

Computer 602 comprises one or more input/output ports 611; a data storage device 612 for example a hard disk drive; a memory component 613; processor 614; a user interface 615; an operating system 616 and a color profile application 617 for profile generation, and a gray neutrality algorithm 618 for applying a gray neutrality calibration process according to a specific method of the present invention.

The standard methods for generating color profiles for printers, including some form of gray balancing, works reasonably well for 4 color printers. However, for 6 color printers, the system does not work so well, specifically with respect to gray neutrality. Consequently, a specific gray neutrality calibration as described here is necessary. In addition, any gray balancing included in a standard printer profile will not be applied to the direct CMYK (device color) path of a printer, whereas as all-device space gray neutrality calibration as described here does.

Additionally, there is a related problem, that of metamerism. This where the color hue perceived varies as a function of the light source under which the printed image is viewed. If the color profile characterization target is measured under a D50 illuminant, then the result of printing after profiling should also be viewed under D50 illuminant, or an illuminant very close to D50.

Even keeping the illuminant data and the illuminating source for viewing as D50, coloration of neutral grays was found using the traditional printer profiling methods.

Another problem using traditional methods on the 6 color ink system was that where color profiling was carried out using an illuminant of 1 type (for example D50), and then the illuminant for viewing was of another type, for example a fluorescent illuminant similar to D50, the perceived result by the viewer varied significantly from neutral gray, a printed image which looked acceptably when viewed under a D50 illuminant or D50 similar illuminant, when viewed under a fluorescent source would look significantly different, and not a neutral gray color.

The gray neutrality calibration according to the specific method disclosed herein addresses each of the above problems.

The first identified problem was analyzed by the inventors as being due to the fact that traditional color profiles did not exercise enough control over low levels of ink colorant.

The second identified problem was the fact that the profiling stage occurs in the 6 color printing device before the plane separation, so that the profile is aimed at a 4 color separation, whereas the actual inks printed result from a 6 color separation, with the overall effect of compounding the problem that the 4 color profile did not have enough control over the final 6 color level signal to give satisfactory gray neutrality results.

Figure 7:
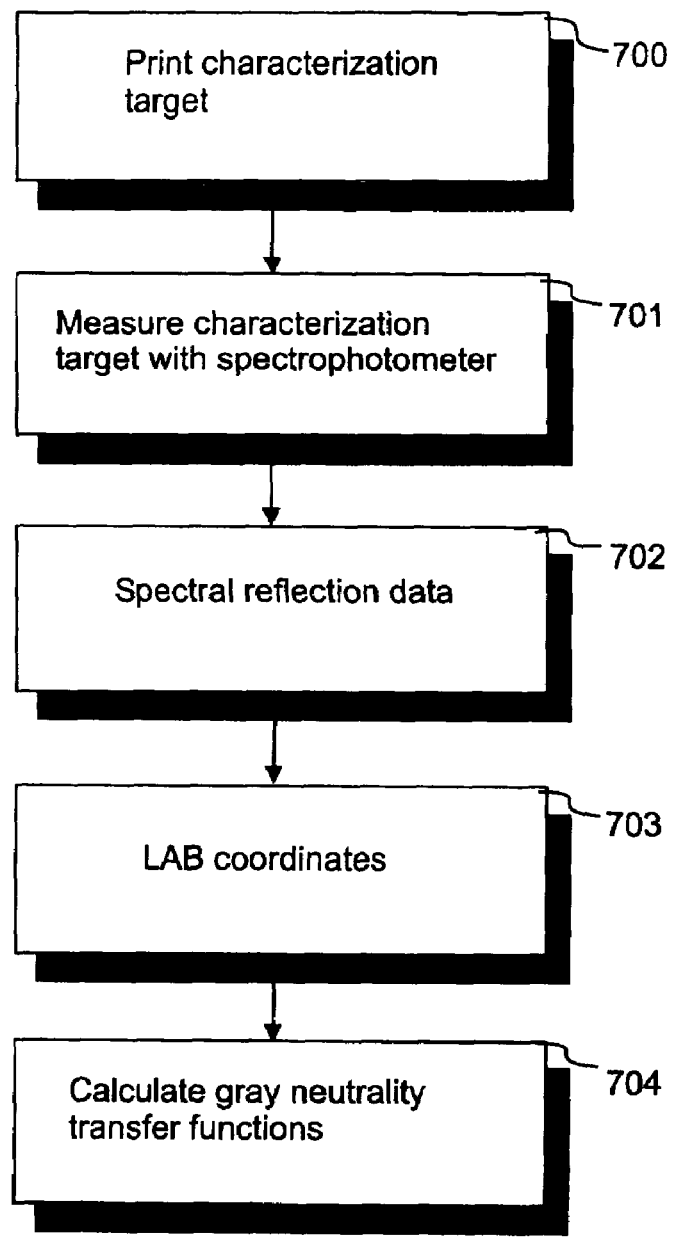
FIG. 7 illustrates schematically a calibration process for calibrating a printer device according to the calibration set up of FIG. 6 herein.

Referring to FIG. 7 herein, there is illustrated schematically process steps carried out by the calibration system for applying a Gray Neutrality Calibration process to a printer device during a manufacture stage, using a spectrophotometer, in which a set of gray neutrality calibration corrections are generated which enable the printer device to print a gray scale image data with accurate gray tones, taking account of variations in media type and ink type, according to a plurality of different print modes of the printer, each print mode comprising a particular combination of print head assembly scan speed, print media feed speed, printing directionality, resolution, etc.

A gray balance characterization target is printed, comprising an array of color patches of grays of intermediate densities ranging from 0 ink, which shows as white on a white print media, to maximum density gray, including small variations of the amounts of C, M and Y inks around the ideal values of C=M=Y. The characterization target is measured with a spectrophotometer in process 701. The process 702, the spectrophotometer generates spectral reflection data from the light reflection from the array of gray patches. The spectral data is input into the computer in process 704 which converts it into LAB coordinate data using one or more illuminants of choice. The LAB coordinate data is then used to calculate a set of gray-balancing correction functions in process 705.

Figure 8:
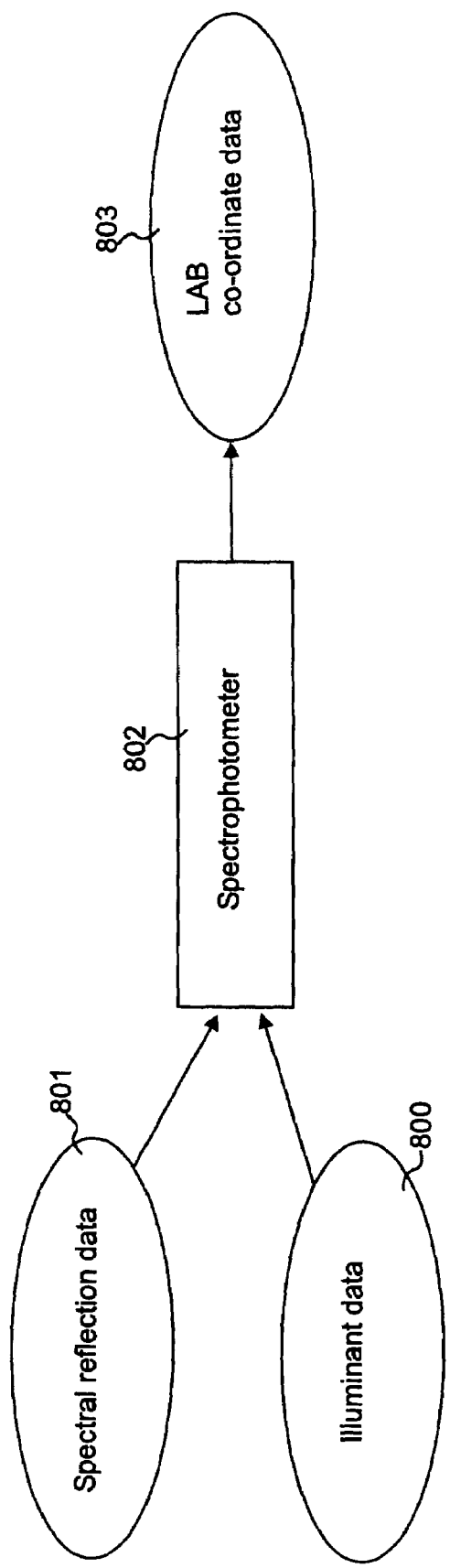
FIG. 8 illustrates schematically a first data flow comprising the calibration process of FIG. 7.

Referring to FIG. 8 herein, there is illustrated schematically a data flow diagram showing data flows in the calibration process, for spectral reflection data 801, illuminant data 800, and LAB co-ordinate data 803 via a spectrophotometer 802.

The gray neutrality correction developed by the inventors operates in 4 color space, and is implemented downstream of the color profile. Said correction operates with much greater resolution than the color profile itself can do.

Separately, in order to address the matamerism issue, the inventors experimented with a set of different illuminants, independent of the standard D50 illuminant used during the standard profiling process, and estimated which ones of those other illuminants would be the most representative of the different environments in which printer devices are commonly deployed, and in which users of printer devices view their prints, and resulted in the creation of a custom illuminant for gray balancing which gives good results under a variety of representative light sources.

One of the criteria on the gray neutrality calibration is that it has to work and be able to be applied in a 4 dimensional color space, that is on a 4 channel color image data CMYK, when jobs are sent to the printer device already in that format. This capability needs to be in built, since there is a legacy of using 4 color channel image data in the marketplace, so users wish to supply image data as 4 dimensional color space image data.

An additional issue also required resolving as follows. Once a gray neutrality calibration was contemplated, 3 transfer functions were generated, one for each color channel C, M, Y which were applied to the color channels independently. Each transfer function is 1 dimensional, taking one value in and outputting a second value. These 3 transfer functions operated in parallel on the C, M & Y channels modify the levels of C, M & Y ink relative to each other, to provide a balanced neutral gray scale at all values of the gray scale from white to black, and at intermediate grays in between. However, there is third problem in that particularly near the darker end of the gray scale one or more of the individual C, M and Y ink levels output from the transfer functions will end up at less than the full density of ink which can be printed. Normally, one would expect a transfer function not to affect the extremes of minimum or maximum, i.e. not to affect the 0 or 100% levels, but to vary the relative levels between 0 and 100% in order to avoid averse effects when printing maximally saturated primary and secondary colors, i.e. non-gray colors.

Therefore, the transfer functions work well for gray colors, but when applied to the whole range of possible colors which can be printed gamut can be lost. That is, the maximum range of colors which can be printed by the printer device can be reduced, by applying the gray neutrality calibration transfer functions as is.

For example, if a red color of maximum saturation is to be printed, this consists of 100% i.e. maximum value of magenta ink and 100% of yellow ink, if this is passed through a gray calibration function, then it might reduce the 100% magenta to 90%, and perhaps the 100% yellow to 95% yellow, meaning that the resultant red color is not as saturated as possible.

Therefore, to avoid the problem of gamut loss, the inventors realized that the transfer functions needed to be applied only when grays were being printed and not when other colors were being printed.

The solution consisted in the definition of a "grayness function" which may be considered as a control channel in addition to the normal CMYK image data channels (Equations 1). The grayness function represents the distance to the ideal gray axis, on a normalized scale of 0 to 1, and returns a number which is a maximum value (1), when the colors are exactly on the gray axis, and a value less than one, when the colors are off the gray axis, where the gray axis is defined as equal values of C, M and Y, and will return a value of 0, when the color channel data is on the gamut surface, which is defined as being where one of the inks is at maximum value (100%) and at least one of the other inks is at a minimum value (0%). The grayness function varies smoothly in between these two extremes of gray and the gamut surface.

Figure 9:
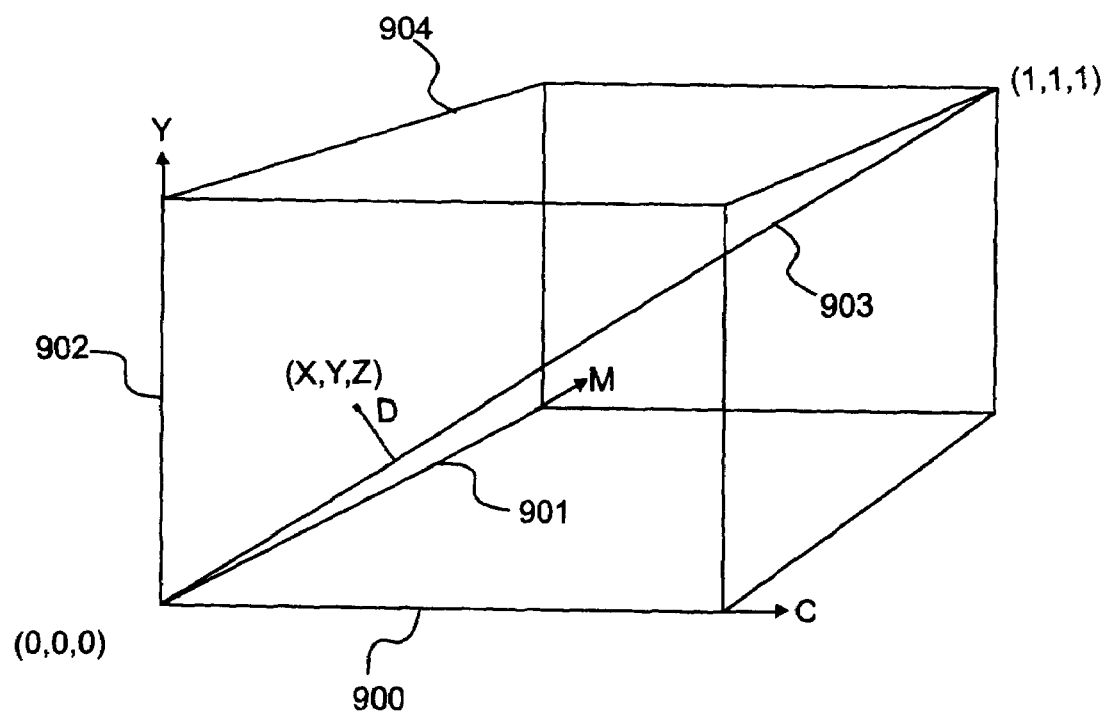
FIG. 9 illustrates schematically a graphical representation of a multi-dimensional color space, illustrating schematically a gray axis and a gamut surface, and a grayness function according to a specific method of the present invention.

Referring to FIG. 9 herein, there is illustrated schematically an example of a multi dimensional color space, in this case a three dimensional color space, where each of three primary colors cyan, magenta and yellow are represented as corresponding respective dimensions 900-902, where the dimensions are orthogonal to each other, a zero signal level, representing zero ink is represented as a value of zero at the origin, and a maximum ink saturation level is represented as a value of one in each dimension. Therefore, the three dimensional color space is represented as a cube of dimension one in each of three directions.

The gray axis is represented as a diagonal line 903 extending between co-ordinates (0,0,0) and (1,1,1) and represents a line consisting of a plurality of co-ordinates, where the values of each primary color are equal to each other, c=m=y.

The gamut surface is represented as the surface 904 of the color space.

The gamut surface is where any one or more of the primary colors has a saturated value.

The grayness function is defined as:

a value of one on the gray axis 903, including the origin (0,0,0) and the point where all three primary colors are saturated, at co-ordinate (1,1,1); and zero on the gamut surface.

At all other positions within the color space, the grayness functions for any combination color represented by a point (x,y,z) is determined as being a distance of the co-ordinates occupied by the color combination in color space and the gray axis line 903. The complement of the grayness function is the distance between the position of the color combination in color space and the gamut surface. In the example shown of a three-dimensional color space, the distance can be represented as the magnitude of a vector. However, in four dimensional or higher dimensional color spaces, the distance does not have a physical distance analogy, but is represented by a mathematical distance. The distances are relative values, having a value between zero and one.

The grayness function and its complement are then used as weights to calculate a linear combination of two sets of color correction functions, one set being in this case the gray neutrality calibration transfer functions, and the other set being in this case a set of identity transfer functions (Equations 2).

For efficiency reasons, said linear combination of transfer functions was implemented using 4-dimensional lookup tables combined with standard interpolation techniques. The values corresponding to each node (control point) of the lookup tables were obtained by applying equations 1 and 2 to each corresponding tuple of input CMYK values.

Specific implementations according to the invention extend to an algorithm for generating a multi-dimensional look up table, for installation into a printer device for applying a gray neutrality calibration data to a multi-dimensional image data, the algorithm comprising components for: applying said lookup tables to a data input of each of a plurality of color signal channels each carrying a single color data of said multi-dimensional image data; and generating an output of said lookup table, such that an input into a said color signal channel for a color combination which lies upon a gamut surface remains unaffected by said gray neutrality calibration.

Further specific implementations of the invention extend to an electronic program data comprising computer instructions for generating a multi-dimensional look up table, the multi-dimensional look up table being suitable for installation into a printer device for applying a gray neutrality calibration data to a multi-dimensional image data, the program data comprising components for: applying said lookup tables to a data input of each of a plurality of color signal channels each carrying a single color data of said multi-dimensional image data; and generating an output of said lookup table, such that an input into a said color signal channel for color combination which lies upon a gamut surface remains unaffected by said gray neutrality calibration.

Yet further specific embodiments of the invention extend to electronic signals comprising program instructions for generating a multi-dimensional look up table, the look up table being suitable for installation into a printer device for applying a gray neutrality calibration data to a multi-dimensional image data in said printer device, the program instructions comprising instructions for: applying said lookup tables to a data input of each of a plurality of color signal channels each carrying a single color data of said multi-dimensional image data; and generating an output of said lookup table, such that an input into a said color signal channel for a color combination which lies upon a gamut surface remains unaffected by said gray neutrality calibration.

In one specific embodiment there is provided a printer device for printing image data, said printer device comprising: a printer mechanism having a media transport mechanism and a printer head mechanism; a print channel capable of inputting a multi-dimensional image data; a multi dimensional look up table capable of applying a gray neutrality function to said multi dimensional image data.

Whilst in the foregoing best mode implementation, there has been described a system and method in which a 3 color RGB or CIELAB signal is converted to a 4 color CMYK signal, or a 4 color CMYK signal is accepted directly by the system, and a 4 dimensional look up table is applied to produce gray neutrality calibration, in principle, the invention is not limited to operate on 4 or 6 channel image data, but may operate on image data having fewer or more color channels.

The invention claimed is:

1. A method of applying a gray neutrality calibration to a color signal, said method comprising:
   representing said color signal as a position in a multi dimensional color space, in which each said dimension of said color space represents a respective primary color;
   defining a gray axis in said multi dimensional color space as a set of coordinates for which a plurality of said primary colors each have a same value as each other;
   determining a distance between said position representing said color signal and said gray axis;
   using said determined distance between said color signal position and said gray axis to apply a gray neutrality correction to said input color signal; and
   for color signal having a position corresponding to a maximum saturated value of at least one said primary color, applying a 0 correction to said color signal.

2. The method as claimed in claim 1, wherein said determined distance is determined as a grayness fraction defined as;
   $g(color)=min(color)/max(color)$ $max(color)>0$
   $g(color)=1$ $max(color)=0$
   where g (color) is the grayness function; and
   (color) is a value of a color signal.

3. The method as claimed in claim 1, wherein said primary colors are non-black primary colors.

4. The method as claimed in claim 1, further comprising:
   applying a first set of gray balancing color corrections to a printer's gray axis, a second set of different color corrections to a printer's gamut surface, and continuously varying intermediate color corrections everywhere else in the gamut;
   calculating a grayness function which evaluates the distance to the gray axis for a plurality of color signals each carrying a single color data of a multi-dimensional image data;
   using the value of said grayness function and its complement as weights for a linear combination of two sets of color corrections applied to a said plurality of color signals; and
   generating an output of said linear combination of color corrections, such that an input into a said color signal channel for a color combination which lies upon the printer's gray axis is affected only by said first set of color corrections, an input into a said color signal channel for a color combination which lies upon the gamut surface is affected only by said second set of color corrections, and an input into a said color signal channel for a color combination which lies in between the gray axis and the gamut surface is affected by both said sets of color corrections, as a function of the distance between said color combination and the gray axis and the distance between the color combination and the gamut surface, respectively.

5. The method as claimed in claim 1, further comprising:
applying a first set of gray balancing color corrections to a printer's gray axis, a second set of different color corrections to a printer's gamut surface, and continuously varying intermediate color corrections everywhere else in the gamut;
calculating a grayness function which evaluates the distance to the gray axis for a plurality of color signals each carrying a single color data of a multi-dimensional image data;
using the value of said grayness function and its complement as weights for a linear combination of two sets of color corrections applied to a said plurality of color signals; and
generating an output of said linear combination of color corrections, such that an input into a said color signal channel for a color combination which lies upon the printer's gray axis is affected only by said first set of color corrections, an input into a said color signal channel for a color combination which lies upon the gamut surface is affected only by said second set of color corrections, and an input into a said color signal channel for a color combination which lies in between the gray axis and the gamut surface is affected by both said sets of color corrections, as a function of the distance between said color combination and the gray axis and the distance between the color combination and the gamut surface, respectively, wherein the two sets of color corrections are both one dimensional.

6. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data; and
generating an output of said transfer function, such that an input into a said color signal channel for a color combination which lies upon a gamut surface remains unaffected by said transfer function.

7. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data; and
generating an output of said transfer function, such that an input into a said color signal channel for a color combination which lies upon a gamut surface remains unaffected by said transfer function;
wherein said process of generating a multi-dimensional look up table data comprises storing data in each of a plurality of dimensions, each dimension corresponding to a respective color channel.

8. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data;
generating an output of said transfer function, such that an input into a said color signal channel for a color combination which lies upon a gamut surface remains unaffected by said transfer function;
identifying a set of individual control points within said multi-dimensional look up table data; and
normalizing said control points to a maximum signal value.

9. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data; and
generating an output of said transfer function, such that an input into a said color signal channel for a color combination which lies upon a gamut surface remains unaffected by said transfer function;
wherein an input data into said plurality of color signal channels comprises a 4 dimensional image data having data for cyan, magenta, yellow and black colors.

10. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data; and
generating an output of said transfer function, such that an input into a said color signal channel for a color combination which lies upon a gamut surface remains unaffected by said transfer function;
said method comprising generating a plurality of said multi-dimensional look up tables, each corresponding to a particular combination of:
ink type;
media type; and
printer resolution.

11. The method as claimed in claim 1, comprising:
determining a grayness function defined as:
$g(color) = min(color)/max(color)$ $max(color) > 0$
$g(color) = 1$ $max(color) = 0$
where g(color) is the grayness function, and (color) c is a value of color signal in a said color signal channel.

12. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data; and generating an output of said transfer function, such that an input into a said color signal channel for a color combination which lies upon a gamut surface remains unaffected by said transfer function;
wherein said multi-dimensional look up table comprises an arbitrary number of control points in each said dimension, where the values at each control point are given by the following equations;

$$c'=g(c,m,y)*GNCc(c)+(1-g(c,m,y))*ID(c)$$

$$m'=g(c,m,y)*GNCm(m)+(1-g(c,m,y))*ID(m)$$

$$y'=g(c,m,y)*GNCy(y)+(1-g(c,m,y))*I-D(y)$$

$$k'=ID(k)$$

where GNC is a gray neutrality transfer function;
ID is an identify transfer function; and
g is a grayness function.

13. The method as claimed in claim 1, comprising:
generating a multi-dimensional look up table for installation into a printer device for applying a gray neutrality calibration data to a multi-dimensional image data;
applying a weighted transfer function to a data input of each of a plurality of color signal channels each carrying a single color data of said multi-dimensional image data; and
generating an output of said transfer function, such that an input into a said color signal channel for a color combination which lies upon a gamut surface remains unaffected by said transfer function;
wherein said multi-dimensional look up table comprises an arbitrary number of control points in each said dimension, where the values at each control point are given by the following equations;

$$color'=g(color)*GNCcolor(color)+(1-g(color))*ID(color)$$

$$k'=ID(k)$$

where GNC(color) is a gray neutrality transfer function for a particular color channel;
g(color) is a grayness function;
ID(color) is an identify transfer function for a particular color; and
k is a color black signal.

14. A printer device for printing image data, said printer device comprising:
a printer mechanism having a media transport mechanism, a printer head mechanism and; a print channel capable of inputting a multi-dimensional image data; and
a multi dimensional look up table capable of applying a gray neutrality function to said multi dimensional image data, wherein said multi dimensional lookup table is generated by:
representing said color signal and said gray axis; and
using said determined distance between said color signal position and said gray axis to apply a gray neutrality correction to said input color signal;
wherein said multi-dimensional look up table comprises an arbitrary number of control points in each dimension, wherein the output values at each control point are given by a linear combination of a gray neutrality transfer function GNC and an identity transfer function ID weighted by the grayness function g and its complement respectively.

15. A printer device for printing image data, said printer device comprising:
a printer mechanism having a media transport mechanism, a printer head mechanism and: a print channel capable of inputting a multi-dimensional image data; and
a multi dimensional look up table capable of applying a gray neutrality function to said multi dimensional image data, wherein said multi dimensional lookup table is generated by:
representing said color signal and said gray axis; and
using said determined distance between said color signal position and said gray axis to apply a gray neutrality correction to said input color signal:
wherein said multi dimensional look up table is generated as an output of a grayness function, said grayness function defined as:

$$g(c,m,y)=\min(c,m,y)/\max(c,m,y) \; \max(c.m.y)>0$$

$$g(c,m,y)=1 \; \max(c,m,y)=0$$

where g(c,m,y) is the grayness function; and c is a value of a cyan color data; and m is a value of a magenta color data; and y is a value of a yellow color data.

16. A printer device for printing image data, said printer device comprising;
a printer mechanism having a media transport mechanism, a printer head mechanism and; a print channel capable of inputting a multi-dimensional image data; and
a multi dimensional look up table capable of applying a gray neutrality function to said multi dimensional image data, wherein said multi dimensional lookup table is generated by:
representing said color signal and said gray axis; and
using said determined distance between said color signal position and said gray axis to apply a gray neutrality correction to said input color signal;
wherein said multi-dimensional took up table comprises an arbitrary number of control points in each said dimension, wherein the values at each control point are given by the following equations;

$$c'=g(c,m,y)*GNCc(c)+(1-g(c,m,y))*ID-(c)$$

$$m'=g(c,m,y)*GNCm(m)+(1-g(c,m,y))*ID(m)$$

$$y'=g(c,m,y)*GNCy(y)+(1-g(c,m,y)-)*ID(y)$$

$$k'=ID(k)$$

where GNC is a gray neutrality transfer function;
ID is an identify transfer function; and
g is a grayness function.

17. A method of applying a gray neutrality calibration to a color signal, said method comprising:
representing said color signal as a position in a multi dimensional color space, in which each said dimension of said color space represents a respective primary color;
defining a gray axis in said multi dimensional color space as a set of coordinates for which a plurality of said primary colors each have a same value as each other;
determining a distance between said position representing said color signal and said gray axis;
using said determined distance between said color signal position and said gray axis to apply a gray neutrality correction to said input color signal; and
for a color signal having a position on said gray axis wherein said color signal has equal values of each of said plurality of primary colors, applying a full value of said correction.

18. A method of applying a gray neutrality calibration to a color signal, said method comprising:

representing said color signal as a position in a multi dimensional color space, in which each said dimension of said color space represents a respective primary color;

defining a gray axis in said multi dimensional color space as a set of coordinates for which a plurality of said primary colors each have a same value as each other;

determining a distance between said position representing said color signal and said gray axis;

using said determined distance between said color signal position and said gray axis to apply a gray neutrality correction to said input color signal;

normalizing each of said primary colors to have values in a range 0 to 1;

representing each position on said gray axis by a value of 1; and representing all points on a gamut surface of said color space by a value 0, except where said gray axis coincides with said gamut surface.

* * * * *